(12) United States Patent
Poon et al.

(10) Patent No.: US 8,162,223 B2
(45) Date of Patent: Apr. 24, 2012

(54) METHOD AND APPARATUS FOR CREATING PIXEL TOKENS FROM MACHINE-READABLE SYMBOLS TO IMPROVE DECODING ACCURACY IN LOW RESOLUTION IMAGES

(75) Inventors: Eunice Poon, Scarborough (CA); Jia Li, North York (CA); Seungsik Kwak, Oakville (CA); Mikhail Brusnitsyn, North York (CA)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 12/719,370

(22) Filed: Mar. 8, 2010

(65) Prior Publication Data

US 2011/0215152 A1      Sep. 8, 2011

(51) Int. Cl.
G06K 7/10       (2006.01)
G06K 19/06      (2006.01)

(52) U.S. Cl. .............................. 235/462.16; 235/462.25

(58) Field of Classification Search ............. 235/462.16, 235/462.25, 462.02, 375
See application file for complete search history.

(56) References Cited

U.S. PATENT DOCUMENTS

| | | | |
|---|---|---|---|
| 5,545,887 A | 8/1996 | Smith et al. | |
| 7,077,323 B2 | 7/2006 | Takakura et al. | |
| 7,168,621 B2 | 1/2007 | Ghai et al. | |
| 7,213,761 B2 | 5/2007 | Liu | |
| 7,562,820 B2 | 7/2009 | Muramatsu | |
| 2006/0043189 A1 | 3/2006 | Agrawal et al. | |

FOREIGN PATENT DOCUMENTS

WO         9609597         3/1996

OTHER PUBLICATIONS

Bar Code Recognition in Highly Distorted and Low Resolution Images, Ramtin Shams and Parastoo Sadeghi, Research School of Information Sciences and Engineering (RSISE), The Australian National University, Canberra, ACT 0200, Australia, IEEE International Conference on Publication Date: Apr. 15-20, 2007, vol. 1, (pp. I-737- I-740).

Implementation of Algorithm to Decode Two-Dimensional Barcode PDF-417, Hee Il Hanh and Joung Koo Joung, Dept. Information and Communications Eng, Hankuk University of Foreign Studies, 89 Wangsan, Mohyun, Yongin, Kyonggi-Do, 449-791, Korea, Signal Processing, 2002 6th International Conference on Publication Date: Aug. 26-30, 2002, vol. 2, (pp. 1791-1794).

*Primary Examiner* — Edwyn Labaze

(57) ABSTRACT

The present invention is directed towards systems and methods for decoding a bar code. Decoding the bar code includes segmenting the bar code into black tokens, white tokens and gray boundary pixels. Decoding the bar code also includes calculating a boundary position of each token with sub-pixel positional accuracy using intensity values of pixels in a boundary region.

18 Claims, 7 Drawing Sheets

METHOD AND APPARATUS FOR CREATING PIXEL TOKENS FROM MACHINE-READABLE SYMBOLS TO IMPROVE DECODING ACCURACY IN LOW RESOLUTION IMAGES

CROSS-REFERENCE TO RELATED APPLICATIONS

This application is related to U.S. patent application entitled "Method and Apparatus for Correcting Decoding Errors in Machine-Readable Symbols," filed on the same day as the present application, which is incorporated by reference herein in its entirety.

BACKGROUND

1. Field of Invention

The present application is directed towards systems and methods for decoding bar codes.

2. Description of Related Art

Machine-readable symbols, often referred to as barcodes, are widely seen in daily life. They usually provide information about market products, parcels, tickets, etc. One type of bar code is the one-dimensional (1D) barcode made up straight dark lines with varying width and spaced at varying intervals. Information is encoded in the width of the bars and in the width of the spaces. FIG. 1 is an illustration of a meal ticket that includes a bar code. There exists a number of methods to locate and decode 1D and 2D barcodes.

One such method of decoding a bar code is described in U.S. patent application Ser. No. 10/390,596 by Sanchin ARGAWAL et al. Decoding a bar code may include scanning an image line-by-line without knowing where the barcode is. Each horizontal scan-line may be segmented into a sequence of black or white pixel groups. Each pixel group may be identified as a token. The segmenting step is referred to as tokenization. Tokenization which consists of converting the image pixel to either black or white (non-black) and grouping continuous black or white pixels together. A bar token may be defined as a group of adjacent black pixels. While a space token may be defined as a group of adjacent white pixels. A bar may be denoted by a zero and a space may be denoted by a one, the image of the current scan line may be converted to an array of zeroes and ones. The width of each token may be measured in units of image pixels and used to decode the bar code.

Prior art methods work well when each token contains a large number of pixels (e.g. 10 or more) and the error introduced by rounding the token width to a whole number of pixels is negligible. However, if the resolution of the scanner used to acquire the barcode image is less than the resolution of the printing device, the token width in image pixels decreases accordingly. As a result, the rounding error may become comparable to the token width. The ratio between the width of wide and narrow tokens can become distorted. This ratio is a key element in the decoding process. Additionally, the effects of noise due either to the image process or the image itself can cause errors in the decoding process. An error of just one pixel can make a big difference.

FIG. 2 is an illustration of a noisy bar-code which prior art methods have trouble decoding.

The present invention is directed towards systems and methods for decoding bar codes when the image of the bar code is noisy or has low resolution relative to the pitch of the bar code.

SUMMARY OF INVENTION

The present invention is directed towards systems and methods for decoding a bar code. Decoding the bar code includes segmenting the bar code into black tokens, white tokens and gray boundary pixels. Decoding the bar code also includes calculating a boundary position of each token with sub-pixel positional accuracy using intensity values of pixels in a boundary region.

In an embodiment of the present invention decoding the bar code may also include averaging adjacent scan lines. An embodiment of the present invention may include obtaining a digital image of the bar code.

In an embodiment of the present invention the bar code is a digital image that consists of an array of pixels. A first axis of the array is substantially parallel to lines of the bar code. A second axis of the array is substantially perpendicular to the lines of the bar code. Decoding the bar code further comprises averaging a set number of pixels along the first axis. In an embodiment of the present invention substantially parallel to, means that an angle between the first axis and the lines of the bar code is less than 1.5°. In an embodiment of the present invention the set number of pixels being averages is 11.

In an embodiment of the present invention, segmenting the bar code includes using one or more thresholds to divide regions of the bar code into black tokens, white tokens, and gray boundary pixels.

In an embodiment of the present invention, calculating the boundary position of each token includes identifying the boundary region. Identifying a boundary pixel in the boundary region associated with a single white token and an adjacent black token with either a maximum gradient value or a minimum gradient value. Calculating the boundary position between a single white token and an adjacent black token based on a position of the boundary pixel, an intensity of the boundary pixel, an intensity of a brightest pixel among pixels of the white token; and an intensity of the darkest pixel among pixels of the black token.

In an embodiment of the present invention, calculating the boundary includes identifying a particular white token adjacent to a particular black token. A first pixel associated with the particular white token may be separated from a second pixel associated with the particular black token by one or more gray boundary pixels. The first pixel may also be adjacent to the second pixel. The first boundary pixel may be identified as the brightest pixel associated with the particular white token. The second boundary pixel may be identified as the darkest pixel associated with the particular black token. The boundary region is identified as the first boundary pixel, the second boundary pixel, and all the pixels between the first boundary pixel and the second boundary pixel. A gradient value is calculated for each pixel in the boundary region. A white-to-black boundary pixel is identified as the pixel in the boundary region with a minimum gradient value. The boundary position is calculated as the sum of a position of the white-to-black boundary pixel and a first quotient. A dividend of the first quotient is equal to a difference between an intensity of the white-to-black boundary pixel and a minimum intensity of pixels in the black token. A divisor of the first quotient is equal to a difference between a maximum intensity of pixels in the particular white token and the minimum intensity of pixels in the particular black token.

In an embodiment of the present invention a second particular white token is identified adjacent to the particular black token. The third pixel associated with the particular second white token may be separated from a fourth pixel associated with the particular black token by one or more gray boundary pixels. The third pixel may also be adjacent to the fourth pixel. The third boundary pixel may be indentified as the brightest pixel associated with the particular second white token. The fourth boundary pixel may be indentified as the darkest pixel associated with the particular black token. A second boundary region is identified as the third boundary pixel, the fourth boundary pixel, and all the pixels between the third boundary pixel and the fourth boundary pixel. A gradient value is calculated for each pixel in the second boundary region. A black-to-white boundary pixel is identified as the pixel in the second boundary region with maximum gradient value. A second boundary position is calculated as the sum of a position of the black-to-white boundary pixel and a second quotient. A dividend of the second quotient is equal to a difference between a maximum intensity of pixels in the second white token and an intensity of the black-to-white boundary pixel. A divisor of the first quotient is equal to a difference between the maximum intensity of pixels in the second white token and the minimum intensity of pixels in the black token. A width of the black token is calculated with sub-pixel accuracy as the difference between the second boundary position and the boundary position.

An embodiment of the present invention may be a computer-readable medium encoded with instructions for decoding a barcode. An embodiment of the present invention may be a bar code reading system including a processor.

An embodiment of the present invention may calculate the width of each black token with sub-pixel accuracy using intensity values of pixels in the boundary region. An embodiment of the present invention may calculate the width of each white token with sub-pixel accuracy using intensity values of pixels in the boundary region.

An embodiment of the present invention may be a system for decoding a bar code including a processor with logic circuits. The logic circuits may perform the steps for decoding the bar code.

An embodiment of the present invention may include a scanner for scanning the bar code to produce the data that represents the bar code. An embodiment of the present invention may include a display for presenting data associated with the bar code. An embodiment of the present invention may include a printer for printing data associated with the bar code.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention is a system and method for decoding bar codes. The present invention provides a method for decoding the bar code when the image is noisy.

In an embodiment of the present invention the bar code being decoded is a one dimensional bar code. A one dimensional bar code is made up of a group of bar and spaces. In an embodiment of the present invention the bar code is made up of bars with a variety of widths. The width of each bar may be a multiple of the width of the narrowest bar. In an embodiment of the present invention the bar code may be an interleaved bar code. In an interleaved bar code the spaces between each bar has a variety of widths. The width of each space may be a multiple of the width of the narrowest bar.

Reading a bar code may include taking an image of the bar code. Reading the bar code may also include segmenting the pixels into tokens. Each token may be a set of pixels that represents either a bar or a space. The present invention provides a way to define the boundaries of a token with sub-pixel accuracy.

Figure 1:
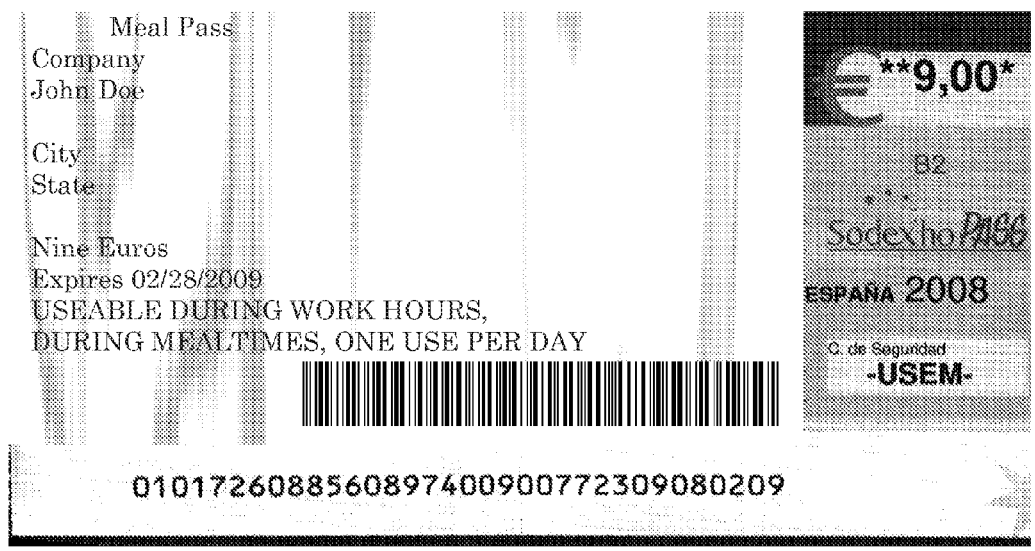
FIG. 1 is an illustration of an item that includes a bar code that an embodiment of the present invention may be used to read.
Figure 2:
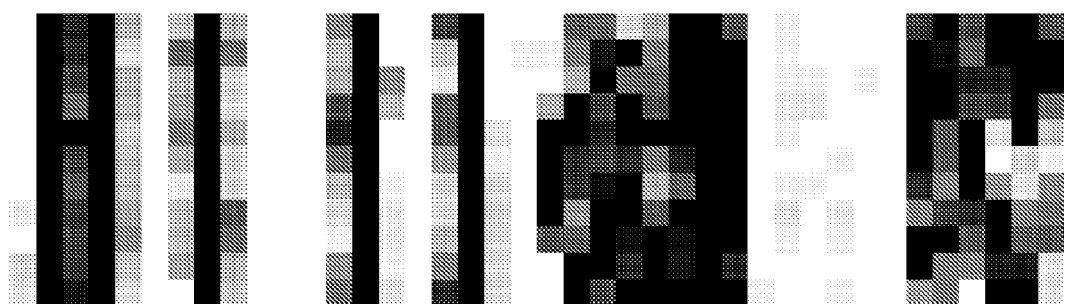
FIG. 2 is an illustration of a noisy bar code.
Figure 3:
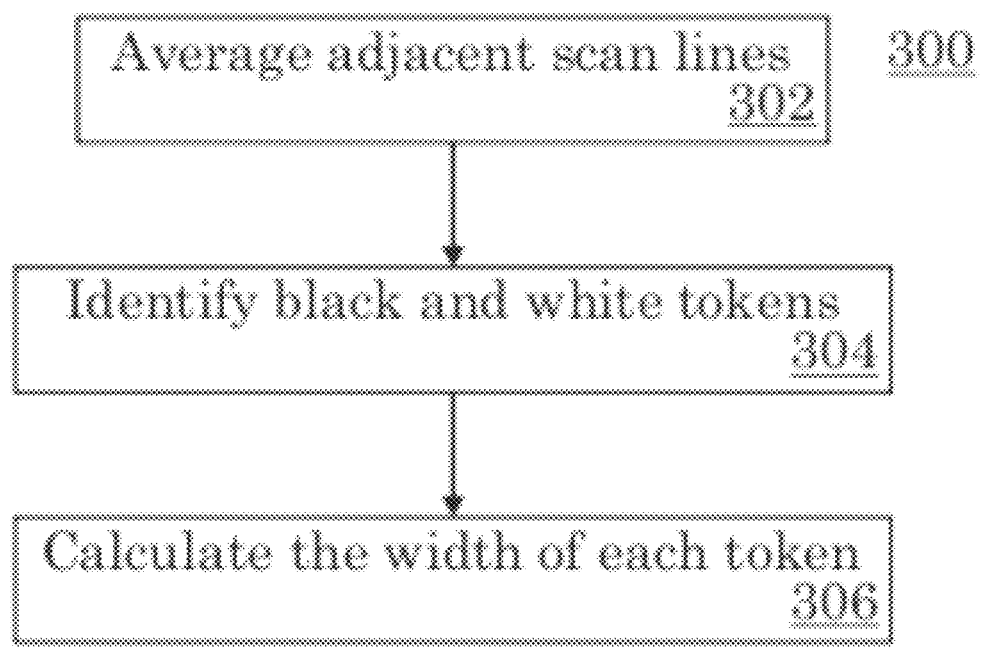
FIG. 3 is a method of performing an embodiment of the present invention.

FIG. 3 is an illustration of a method 300 for tokenizing an image of a bar code.

Pixel Averaging

In a step 302 a number of adjacent scan lines may be averaged by calculating the average intensity value I of corresponding pixels in each scan line as described in equation (1), in which N is the number of averaged scan lines.

$$I_{AVG} = \frac{1}{N}\sum_{i=1}^{N} I_i \qquad (1)$$

The value of N is selected as a compromise between the efficiency of averaging, processing speed, and maximum possible skew of the barcode symbol. On one hand, increasing the number of scan lines improves detection accuracy in noisy images. On the other hand, it reduces processing speed and increases the sensitivity of the detection method to image skew. In an embodiment of the present invention in which the skew has been kept below 1.5 degrees, a reasonable value for N is 11. The image of the bar code may be rotated to minimize the skew.

In an alternative embodiment of the present invention a total intensity, $$I_{TOTAL} = \sum_{i=1}^{N} I_i,$$

is calculated and used in place of an average intensity.

Figure 4:
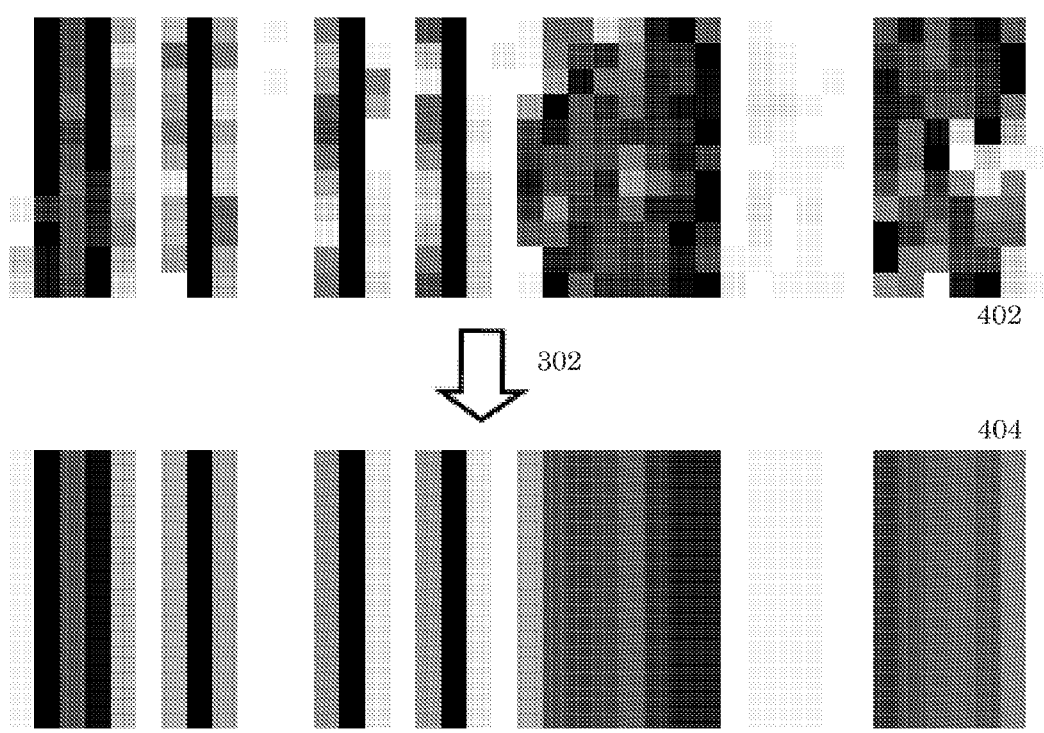
FIG. 4 is an illustration of a noise bar code and the result of averaging the noisy bar code.

As shown in FIG. 4, the averaging step 302 may be performed on a noisy pixels 402 resulting in averaged pixels 404 with gray scale bars.

Token Identification

Figure 5:
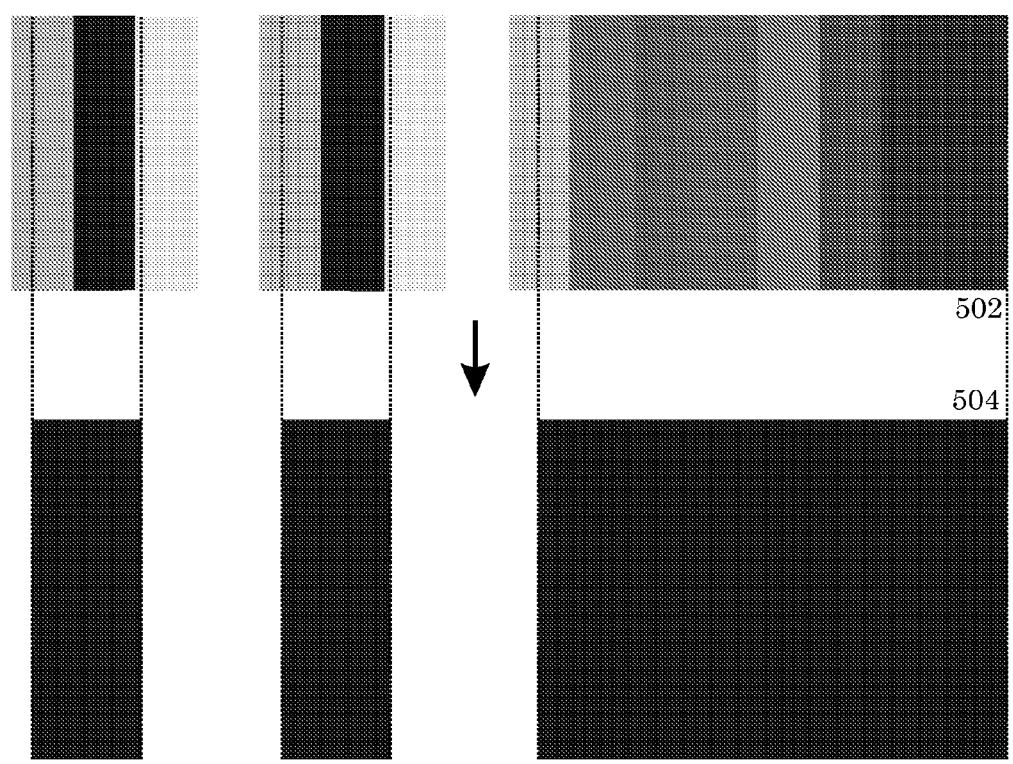
FIG. 5 is an illustration of a gray scale image of a bar code and the results of identifying the boundaries between black and white tokens.

FIG. 5 is an illustration of the results of identifying the boundaries between black and white tokens. As illustrated in FIG. 5 a series of gray scale bars 502 can be analyzed to identify the tokens 504. Each of the gray scale bars 502 has width of one pixel. While the boundaries of tokens 504 are identified with sub-pixel accuracy. The dotted lines show the identified boundaries. In an embodiment of the present invention the scanning resolution of a scanner used to scan the bar code ensures the width of the narrowest bar of the bar code in a digital image is at least 2 pixels wide. In an embodiment of the present invention, the scanning resolution is such that width of the narrowest bar of the bar code in the digital image is less than 2 pixels wide and the results of the token identification are less reliable.

In the following discussion the intensity I is used to refer to the average intensity $I_{AVG}$ calculated in step 302. The intensity $I(X)$ is a function of pixel position X. In the following discussion the higher the intensity the brighter, or whiter the pixel. Likewise the lower intensity means that the pixel represents a darker color, or blacker pixel. An individual skilled in the art will appreciate that this ordering is arbitrary and the ordering may be reversed without changing the spirit of the invention. An individual skilled in the art will appreciate how to alter the invention to adapt to this by swapping the minimum and maximum functions.

Figure 6A:
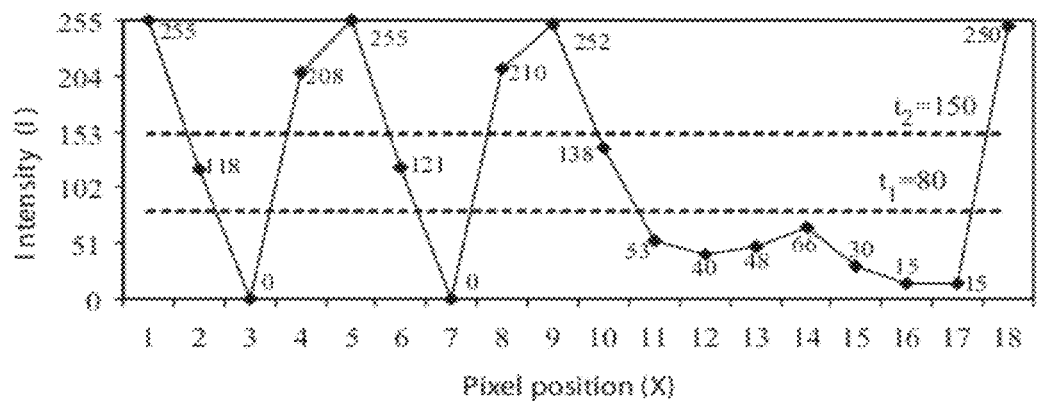
FIGS. 6A-6B are illustrations of data that may be used in an embodiment of the present invention.

In a step 304 the averaged pixels are classified according to two thresholds $t_1$ and $t_2$, $t_1 \leq t_2$ (when $t_1 = t_2$ a single threshold is used) as illustrated in FIG. 6A. Pixels having intensity values I less than $t_1$ are considered 'black'. Pixels with intensity values I higher than $t_2$ are considered 'white'. Other pixels are considered 'gray'. In the case of a single threshold in which $t_1 = t_2$ the pixels with an intensity equal to the threshold may be considered 'gray'. In an alternative embodiment of the present invention zero gray pixels are identified.

A black token may be formed from a set of adjacent black pixels. In an embodiment of the present invention, gray pixels between black pixels may be assigned to the black token. An intensity $I_B$ equal to the value of the darkest pixel in the black token is assigned to the black token. Similarly, a white token is formed from the set of adjacent white pixels. In an embodiment of the present invention, gray pixels between white pixels may be assigned to the white token. An intensity $I_W$ equal to the value of the brightest pixel in the white token is assigned to the white token. The remaining gray pixels are not attributed to any token in a step 304.

As shown in FIG. 6A, pixel 1 is assigned to a first white token with an intensity $I_W$ of 255. Pixel 3 is assigned to a first black token with an intensity of $I_B$ of 0. Pixels 4 and 5 are assigned to a second white token with an intensity of $I_W$ of 255. Pixel 7 is assigned to a second black token with an intensity of $I_B$ of 0. Pixels 8 and 9 are assigned to a third white token with an intensity of $I_W$ of 252. Pixels 11-17 are assigned to a third black token with an intensity of $I_B$ of 15. Pixel 18 is assigned to a fourth black token with an intensity of $I_W$ of 250.

Calculating the Token Width

The presence of gray pixels between black and white tokens is caused by the fact that a single pixel partially represents a bar and a space. In an embodiment of the present invention the fractional representation of bar and space in a gray pixel is calculated from its intensity value.

Figure 6B:
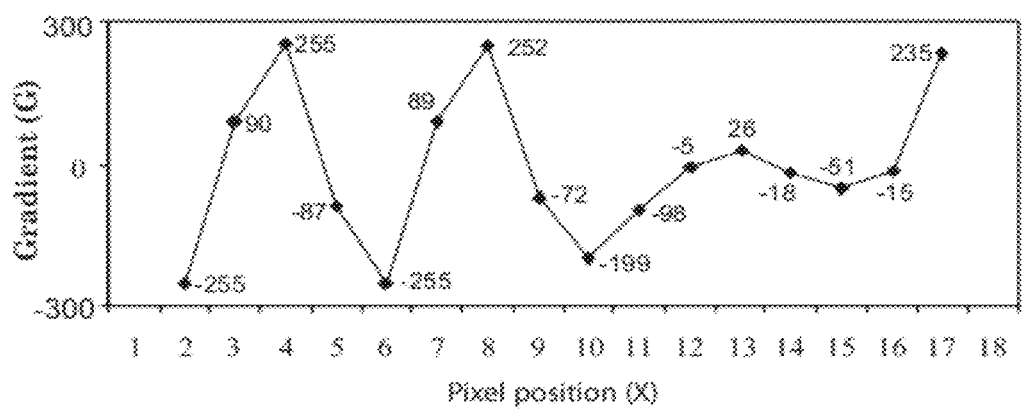

An embodiment of the present invention includes a tokenization method that calculates the width of each token with a sub-pixel accuracy using the intensity values of gray boundary pixels in a step 306. First, a gradient G at each pixel position X is determined as a difference between intensity values of the next and previous pixels as described in equation (2). FIG. 6B is an illustration of the results of a gradient calculation.

$$G(X) = I_{NEXT} - I_{PREV} = I(X+1) - I(X-1) \qquad (2)$$

In an alternative embodiment of the present invention the gradient is only calculated at or near token boundaries. Other methods of calculating the gradient which are well known in the art may be used without going beyond the scope and spirit of the present invention.

The specific location of a boundary between adjacent tokens may be determined by analyzing gradient values in a region that includes any space that may exist between the adjacent tokens and portions of each of the adjacent tokens.

The boundary between two tokens may be identified and separated into two cases. In the first case, the boundary is between: a white token with maximum intensity $I_W$ at a pixel position $X_W$; and a black token with minimum intensity $I_B$ at a pixel position $X_B$ which is greater than the pixel position $X_W$, $X_B > X_W$. The first case identifies the white to black boundary. The pixel positions $X_W$ and $X_B$ may occur at any point within their respective token. For example the darkest pixel within a black token $X_B$ may occur at a near edge of the token, within the middle of the token or at a far edge of the token. Likewise for the brightest pixel within a white pixel.

In the second case, the boundary is between a black token with minimum intensity $I_B$ at a pixel position $X_B$; and a white token with maximum intensity $I_W$ at a pixel position $X_W$ which is greater than the pixel position $X_B$, $X_W > X_B$. The second case identifies the black to white boundary.

For the first case an embodiment of the present invention identifies a pixel with the minimum negative gradient value in the pixel range from $X_W$ to $X_B$ inclusive as described in equation (3). The pixel range from $X_W$ to $X_B$ inclusive may be identified as a boundary region. The boundary region may be 2 pixels wide, 3 pixels wide, or even wider depending on the noise in the image, intensity variation in the individual tokens and the pixel density.

$$I_G(X_B > X_W) = \min(G(X_B \geq X \geq X_W)) \qquad (3)$$

The intensity value $I_G$ at pixel position $X_G$ with the minimum gradient is used to calculate the exact boundary position in 0.001 pixel units using equation (4). The boundary region in which the gradient search is performed may be narrow and only include 2 pixels, or may be quite wide and may include the region of space occupied by one or both tokens, or a significant portion of the space occupied by one or both tokens.

$$B_{WB} = \left(X_G + \frac{I_G - I_B}{I_W - I_B}\right) * 1000 \qquad (4)$$

For the second case an embodiment of the present invention identifies a pixel with the maximum positive gradient value in the pixel range from $X_B$ to $X_W$ inclusive as described in equation (5). As above the pixel range from $X_B$ to $X_W$ inclusive may be identified as the boundary region.

$$I_G(X_W > X_B) = \max(G(X_W \geq X \geq X_B)) \qquad (5)$$

The intensity value $I_G$ at this pixel position $X_G$ with the maximum gradient is used to calculate the exact boundary position in 0.001 pixel units using equation (6).

$$B_{BW} = \left(X_G + \frac{I_W - I_G}{I_W - I_B}\right) * 1000 \quad (6)$$

The width of each token may be calculated as a difference between its right and left boundaries in 0.001 pixel units.

EXAMPLE

FIG. 5 is an example of gray scale data and converting it to bar code tokens. FIG. 6A shows the data associated with the gray scale data in FIG. 5. FIG. 6B is an illustration of the gradient (G) data associated with the gray scale date in FIG. 5.

The second black token consists of one black pixel with an intensity $I_B=0$ at position $X_B=7$. The white space on the left consists of two white pixels with the brightest one having an intensity value of $I_W=255$ at a position $X_W=5$. Search for a pixel with the minimum gradient in the range 5 to 7 inclusive yields pixel 6 ($G=-255$, $X_G=6$, $I_G=121$), as described in equation (3). Equation (7) shows how the boundary position in 0.001 pixel units is calculated based on equation (4).

$$\begin{aligned}B_{WB} &= \left(X_G + \frac{I_G - I_B}{I_W - I_B}\right) * 1000 \quad (7)\\ &= \left(6 + \frac{121 - 0}{255 - 0}\right) * 1000 \\ &= 6475\end{aligned}$$

The second white token on the right of the second black token consists of two white pixels with the brightest one having an intensity value $I_W=252$ at position $X_W=9$. Search for a pixel with the maximum gradient in the range 7 to 9 inclusive yields pixel 8 ($G=252$, $X_G=8$, $I_G=210$), as described in equation (5). Equation (8) shows how the boundary position in 0.001 pixel units is calculated based on equation (6).

$$\begin{aligned}B_{BW} &= \left(X_G + \frac{I_W - I_G}{I_W - I_B}\right) * 1000 \quad (8)\\ &= \left(8 + \frac{252 - 210}{252 - 0}\right) * 1000 \\ &= 8167\end{aligned}$$

The width of the second black token is calculated based on the difference of equations (8) and (7) as $B_{BW} - B_{WB} = 8167 - 6475 = 1692$, or 1.692 pixels.

The boundary position of $B_{WB}$ between the second white token and the third black token may also be calculated. As stated above the second white token consists of two white pixels with the brightest one having an intensity value $I_W=252$ at position $X_W=9$. While the third black token consists of seven black pixels with the darkest one having an intensity $I_B=15$ at a position $X_B=16$. Search for a pixel with the minimum gradient in the range 9 to 16 inclusive yields pixel 10 ($G=-199$, $X_G=10$, $I_G=138$), as described in equation (3)

Equation (9) shows how the boundary position in 0.001 pixel units is calculated based on equation (4).

$$\begin{aligned}B_{WB} &= \left(X_G + \frac{I_G - I_B}{I_W - I_B}\right) * 1000 \quad (9)\\ &= \left(10 + \frac{138 - 15}{252 - 15}\right) * 1000 \\ &= 10519\end{aligned}$$

Notice that in equation (9) the boundary position is calculated based on values that are not at the intensity limits. Notice also that the boundary region, in which the gradient is searched, includes the entire third black token. Also notice that the third token includes two pixels with the darkest intensity within the third token. An individual skilled in the art will appreciate that either pixel may be used to represent the position $X_B$.

System

Figure 7:
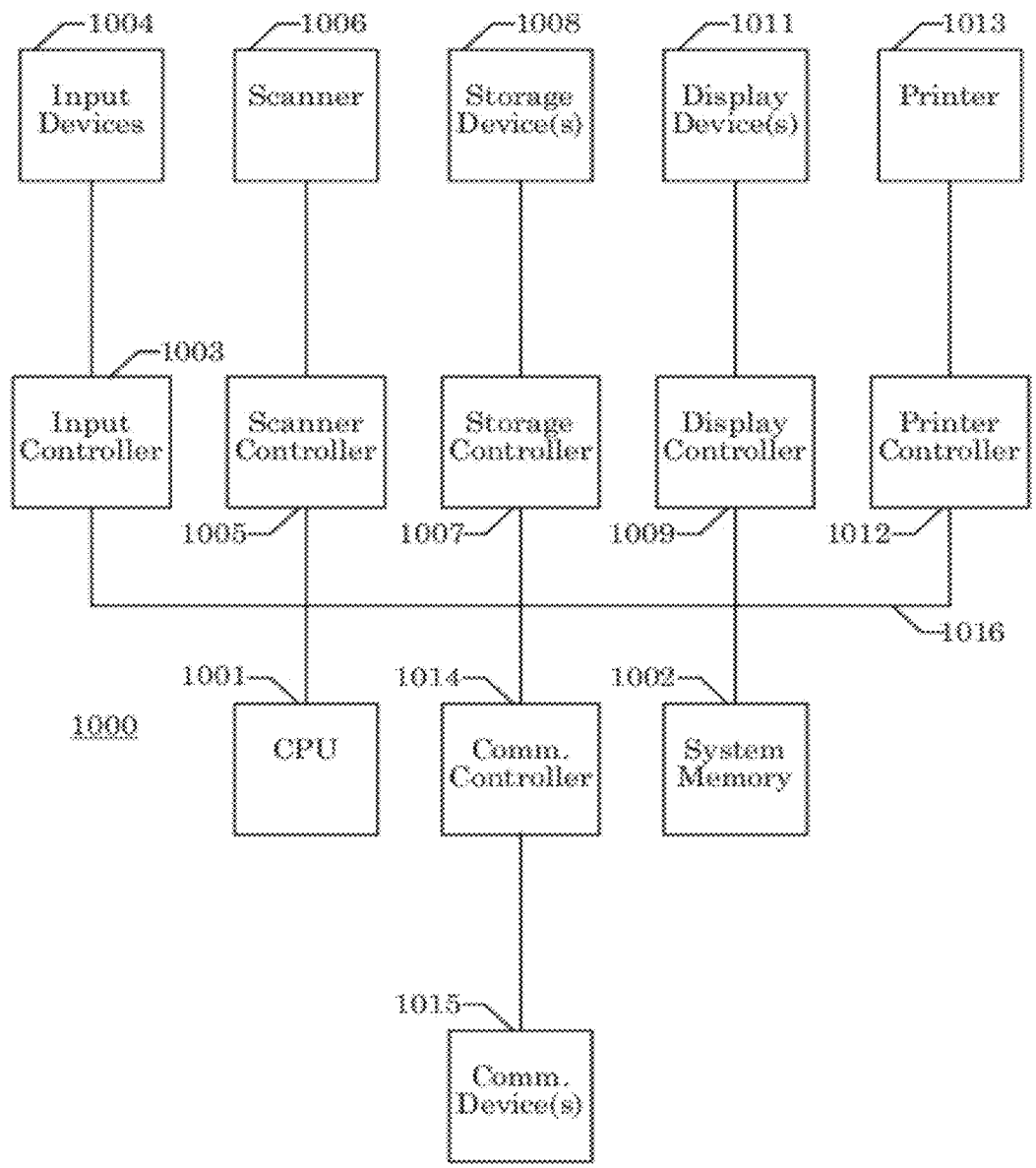
FIG. 7 is an illustration a system that may be used to perform an embodiment of the present invention.

Having described the details of the invention, an exemplary system 1000, which may be used to implement one or more aspects of the present invention, will now be described with reference to FIG. 7. As illustrated in FIG. 7, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 7. An input controller 1003 represents an interface to various input device(s) 1004, such as a keyboard, mouse, or stylus. There may also be a scanner controller 1005, which communicates with a scanner 1006. The scanner may be used to scan bar codes. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The display may be used to present data associated with the bar code. The system 1000 may also include a printer controller 1012 for communicating with a printer 1013. The printer may be used to print data associated with the bar code. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals. The system may also include a cash register.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for decoding a bar code comprising:
   segmenting the bar code into black tokens, white tokens and gray boundary pixels; and
   calculating a boundary position of each token with sub-pixel positional accuracy using intensity values of pixels in a boundary region;
   wherein calculating the boundary position of each token includes:
   identifying the boundary region, identifying a boundary pixel in the boundary region associated with a single white token and an adjacent black token with either a maximum gradient value or a minimum gradient value; and
   calculating the boundary position between a single white token and an adjacent black token based on a position of the boundary pixel, an intensity of the boundary pixel, an intensity of a brightest pixel among pixels of the white token; and an intensity of the darkest pixel among pixels of the black token.

2. The method of claim 1, further comprising, averaging adjacent scan lines.

3. The method of claim 1, wherein decoding the bar code further comprises obtaining a digital image of the bar code.

4. The method of claim 1, in which the bar code is a digital image that consists of an array of pixels, in which a first axis of the array is substantially parallel to lines of the bar code, and a second axis is substantially perpendicular to the lines of the bar code, wherein decoding the bar code further comprises averaging a set number of pixels along the first axis.

5. The method of claim 4, wherein substantially parallel to means that an angle between the first axis and the lines of the bar code is less than 1.5°.

6. The method of claim 4, wherein the set number of pixels is 11.

7. The method of claim 1, wherein segmenting the bar code includes using one or more thresholds to divide regions of the bar code into black tokens, white tokens, and gray boundary pixels.

8. The method of claim 1, further comprising calculating the width of each black token with sub-pixel accuracy using intensity values of pixels in the boundary region.

9. The method of claim 1, further comprising calculating the width of each white token with sub-pixel accuracy using intensity values of pixels in the boundary region.

10. A method for decoding a bar code comprising:
    segmenting the bar code into black tokens, white tokens and gray boundary pixels; and
    calculating a boundary position of each token with sub-pixel positional accuracy using intensity values of pixels in a boundary region;
    wherein calculating the boundary includes:
    identifying a particular white token adjacent to a particular black token, in which: a first pixel associated with the particular white token is separated from a second pixel associated with the particular black token by one or more gray boundary pixels; or the first pixel is adjacent to the second pixel;
    identifying a first boundary pixel as the brightest pixel associated with the particular white token;
    identifying a second boundary pixel as the darkest pixel associated with the particular black token;
    identifying the boundary region as the first boundary pixel, the second boundary pixel, and all the pixels between the first boundary pixel and the second boundary pixel;
    calculating a gradient value for each pixel in the boundary region;
    identifying a white-to-black boundary pixel as the pixel in the boundary region with a minimum gradient value; and
    calculating the boundary position as the sum of a position of the white-to-black boundary pixel and a first quotient; a dividend of the first quotient being equal to a difference between an intensity of the white-to-black boundary pixel and a minimum intensity of pixels in the black token; and a divisor of the first quotient being equal to a difference between a maximum intensity of pixels in the particular white token and the minimum intensity of pixels in the particular black token.

11. The method of claim 10, further comprising:
    identifying a second particular white token adjacent to the particular black token, in which: a third pixel associated with the particular second white token is separated from a fourth pixel associated with the particular black token by one or more gray boundary pixels; or the third pixel is adjacent to the fourth pixel;
    identifying a third boundary pixel as the brightest pixel associated with the particular second white token;
    identifying a fourth boundary pixel as the darkest pixel associated with the particular black token;
    identifying a second boundary region as the third boundary pixel, the fourth boundary pixel, and all the pixels between the third boundary pixel and the fourth boundary pixel;

calculating a gradient value for each pixel in the second boundary region;

identifying a black-to-white boundary pixel as the pixel in the second boundary region with maximum gradient value;

calculating a second boundary position as the sum of a position of the black-to-white boundary pixel and a second quotient; a dividend of the second quotient being equal to a difference between a maximum intensity of pixels in the second white token and an intensity of the black-to-white boundary pixel; and a divisor of the first quotient being equal to a difference between the maximum intensity of pixels in the second white token and the minimum intensity of pixels in the black token; and calculating a width of the black token with sub-pixel accuracy as the difference between the second boundary position and the boundary position.

12. A computer-readable medium encoded with instructions for performing the method of claim 1.

13. A bar code reading system including a processor for performing the method of claim 1.

14. A non-transitory computer readable medium encoded with instructions for decoding a bar code comprising:

instructions for segmenting the bar code into black tokens, white tokens and gray boundary pixels; and instructions for calculating a boundary position of each token with sub-pixel positional accuracy using intensity values of pixels in a boundary region;

wherein calculating the boundary position of each token includes:

identifying the boundary region, identifying a boundary pixel in the boundary region associated with a single white token and an adjacent black token with either a maximum gradient value or a minimum gradient value; and calculating the boundary position between a single white token and an adjacent black token based on a position of the boundary pixel, an intensity of the boundary pixel, an intensity of a brightest pixel among pixels of the white token; and an intensity of the darkest pixel among pixels of the black token.

15. A system for decoding a bar code including:

a processor with logic circuits;

logic circuits configured to segment data representing the bar code into black tokens, white tokens and gray boundary pixels; and logic circuits for calculating a boundary position of each token with sub-pixel positional accuracy using intensity values of pixels in a boundary region;

wherein calculating the boundary position of each token includes:

identifying the boundary region, identifying a boundary pixel in the boundary region associated with a single white token and an adjacent black token with either a maximum gradient value or a minimum gradient value; and calculating the boundary position between a single white token and an adjacent black token based on a position of the boundary pixel, an intensity of the boundary pixel, an intensity of a brightest pixel among pixels of the white token; and an intensity of the darkest pixel among pixels of the black token.

16. The system of claim 15, further comprising a scanner for scanning the bar code to produce the data that represents the bar code.

17. The system of claim 15 further comprising a display for presenting data associated with the bar code.

18. The system of claim 15 further comprising a printer for printing data associated with the bar code.

* * * * *

UNITED STATES PATENT AND TRADEMARK OFFICE
CERTIFICATE OF CORRECTION

PATENT NO.      : 8,162,223 B2
APPLICATION NO. : 12/719370
DATED           : April 24, 2012
INVENTOR(S)     : Eunice Poon et al.

It is certified that error appears in the above-identified patent and that said Letters Patent is hereby corrected as shown below:

IN THE CLAIMS:

Column 10, Claim 10, Line 33, please change "indentifying" to --identifying--.

Column 10, Claim 10, Line 35, please change "indentifying" to --identifying--.

Column 10, Claim 11, Line 60, please change "indentifying" to --identifying--.

Column 10, Claim 11, Line 62, please change "indentifying" to --identifying--.

Signed and Sealed this
Nineteenth Day of June, 2012

David J. Kappos
*Director of the United States Patent and Trademark Office*